US010185161B2

(12) United States Patent
Gromotka et al.

(10) Patent No.: US 10,185,161 B2
(45) Date of Patent: Jan. 22, 2019

(54) SPECTACLES COMPRISING A SPECTACLES LENS WITH A MOVEABLE LENS SEGMENT

(71) Applicant: Carl Zeiss Vision International GmbH, Aalen (DE)

(72) Inventors: Jeremias Gromotka, Aalen (DE); Timo Kratzer, Aalen (DE); Gerhard Kelch, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 15/947,841

(22) Filed: Apr. 8, 2018

(65) Prior Publication Data

US 2018/0231803 A1  Aug. 16, 2018

Related U.S. Application Data

(63) Continuation of application No. PCT/EP2016/073920, filed on Oct. 6, 2016.

(30) Foreign Application Priority Data

Oct. 8, 2015 (DE) .................. 10 2015 219 482

(51) Int. Cl.
*G02C 7/06* (2006.01)
*G02C 7/08* (2006.01)
(Continued)

(52) U.S. Cl.
CPC ......... *G02C 7/086* (2013.01); *G02B 27/0093* (2013.01); *G02B 27/0176* (2013.01); *G02C 7/081* (2013.01); *G02B 2027/0123* (2013.01)

(58) Field of Classification Search
CPC ... G02C 7/086; G02B 27/0093; G02B 27/076
(Continued)

(56) References Cited

U.S. PATENT DOCUMENTS

| 4,895,261 A | 1/1990 | Yacobian |
| 8,496,329 B2 | 7/2013 | Spivey et al. |

(Continued)

FOREIGN PATENT DOCUMENTS

| DE | 10047323 A1 | 4/2001 |
| EP | 0 341 998 A1 | 11/1998 |

(Continued)

OTHER PUBLICATIONS

International Preliminary Report on Patentability of the European Patent Office, dated Jan. 4, 2018, and issued in PCT/EP2016/073920, of which this application is a continuation, and English-language translation thereof, dated Mar. 2, 2018.

(Continued)

*Primary Examiner* — Calvin C Ma
(74) *Attorney, Agent, or Firm* — Ewers & Hasselmann PLLC (57) ABSTRACT

Spectacles include a spectacles lens having a carrier lens with a carrier lens front surface and/or a carrier lens rear surface, and having a front surface lens segment arranged on the carrier lens front surface and/or a rear surface lens segment arranged on the carrier lens rear surface, which are moveably guided on the carrier lens front surface and/or the rear surface lens segment, respectively. Further, the spectacles include a front/rear surface lens segment drive for moving the front/rear surface lens segment on the carrier lens front/rear surface, respectively; an eye position detection device for detecting the position of an eye of a wearer wearing the spectacles; and a drive control device for controlling the front and/or rear surface lens segment drive in accordance with the position of the eye detected by the eye position detection device.

20 Claims, 2 Drawing Sheets

(51) Int. Cl.
 *G02B 27/00* (2006.01)
 *G02B 27/01* (2006.01)
(58) Field of Classification Search
 USPC .................................................. 345/156, 157
 See application file for complete search history.

(56) References Cited

U.S. PATENT DOCUMENTS

| | | |
|---|---|---|
| 8,681,426 B2 | 5/2014 | Larson |
| 2007/0097316 A1* | 5/2007 | Peli .......................... G02C 7/14 351/159.17 |
| 2010/0208194 A1* | 8/2010 | Gupta ...................... G02B 3/14 351/159.68 |
| 2012/0057124 A1 | 3/2012 | Spivey et al. |
| 2012/0194781 A1 | 8/2012 | Agurok |
| 2013/0114146 A1* | 5/2013 | Larson ................... G02B 27/01 359/632 |

FOREIGN PATENT DOCUMENTS

| | | |
|---|---|---|
| EP | 2 590 002 A1 | 5/2013 |
| GB | 2498171 A | 7/2013 |
| WO | 2014/124707 A1 | 8/2014 |

OTHER PUBLICATIONS

International Search Report and English-language translation of the European Patent Office issued in PCT/EP2016/073920, of which this application is a continuation, dated Dec. 21, 2016.

* cited by examiner

SPECTACLES COMPRISING A SPECTACLES LENS WITH A MOVEABLE LENS SEGMENT

CROSS REFERENCE TO RELATED APPLICATIONS

This application is a continuation application of International application PCT/EP2016/073920, filed Oct. 6, 2016, which claims priority to German patent application DE 10 2015 219 482.5 filed on Oct. 8, 2015, both of which are hereby incorporated by reference in their entireties.

TECHNICAL FIELD

The disclosure relates to spectacles having a spectacle lens comprising a carrier lens and a displaceable lens segment.

BACKGROUND

Spectacle lenses are known in many variations from the related art. There are spectacle lenses without nominal dioptric power and correction spectacle lenses, that is to say spectacle lenses having dioptric power. Dioptric power is the collective term for the focusing and the prismatic power of a spectacle lens.

In the case of correction spectacle lenses, a distinction is drawn between single-vision spectacle lenses and multifocal spectacle lenses. A single-vision spectacle lens is a spectacle lens in which only one dioptric power is present in respect of the design. A multifocal spectacle lens is a spectacle lens in which two or more visibly different parts having different focusing powers are present in respect of the design. Importance is attached in particular to bifocal spectacle lenses, namely multifocal spectacle lenses comprising two parts, usually for distance vision and near vision, and to progressive spectacle lenses, namely spectacle lenses comprising at least one progressive surface and an increasing (positive) power when the wearer of the spectacles looks down. Degressive spectacle lenses are uncommon, i.e., spectacle lenses comprising at least one progressive surface and a decreasing power (i.e., an attenuation of the power) when the wearer of the spectacles looks up.

GB 2498171 A, U.S. Pat. No. 8,496,329 B2, and WO 2014/124707 A1 basically describe single-vision spectacles having spectacle lenses including two lens segments, which are displaceable relative to one another, to be able to freely set the refractive power. Various mechanisms are described for displacing the lens segments relative to one another.

There are multifocal spectacle lenses of integral embodiment and also of compound, multipartite embodiment. Different variants of multifocal spectacle lenses in which, inter alia, bifocal or progressive segments are applied on a basic lens are described e.g., in EP 0 341 998 A1.

US 2012/194781 A1 describes spectacles of the generic type which are controlled by an eye tracker.

Current spectacle lenses are optimized for a visual point of the wearer of the spectacles through the spectacle lens. If the wearer of the spectacles moves only the eyes instead of the entire head, the calculated visual point no longer corresponds to reality. Since the eyes of human beings wander typically by up to 15° during normal vision behavior before the head is tracked, first-time wearers of progressive spectacles, for instance, have to relearn seeing with the new spectacles.

SUMMARY

It is an object of the disclosure to provide spectacles including spectacle lenses, which spectacles can be better adapted to the instantaneous visual point of the wearer of the spectacles through the respective spectacle lens.

This object is achieved with spectacles having a spectacle lens comprising a carrier lens and a displaceable lens segment, as disclosed herein.

The spectacles according to the disclosure include at least a spectacle lens comprising a carrier lens and a lens segment. The carrier lens has a front surface, which is referred to hereinafter as carrier lens front surface, and a rear surface, which is referred to hereinafter as carrier lens rear surface. The front surface is the object-side surface, that is to say the surface of the spectacle lens that faces away from the eye as intended in the spectacles. Accordingly, the rear surface is the eye-side surface, namely the surface of the spectacle lens which faces the eye as intended in the spectacles. The lens segment can be arranged on the carrier lens front surface or on the carrier lens rear surface. It is also possible for a (at least one) lens segment to be arranged in each case on the carrier lens front surface and on the carrier lens rear surface.

If the lens segment is arranged on the carrier lens front surface, then it is referred to hereinafter as front surface lens segment, and if it is arranged on the carrier lens rear surface, then it is referred to hereinafter as rear surface lens segment.

The front surface lens segment is guided displaceably on the carrier lens front surface. Alternatively or additionally, the rear surface lens segment can also be guided displaceably on the carrier lens rear surface. Since, in accordance with the explanations above, the eyes typically do not wander by more than 15° during normal vision behavior before the head is tracked, the inventors are striving for mechanical concomitant guidance of at least part of the optical assembly of the spectacles. This becomes possible by means of the above-described configuration of the lens segment or of the lens segments according to the disclosure.

To be able to position the corresponding respective lens segment, i.e., the rear surface lens segment and/or the front surface lens segment, at the carrier lens location currently desired in each case, the disclosure optionally provides a front surface lens segment drive in order to displace the front surface lens segment on the carrier lens front surface, and/or a rear surface lens segment drive in order to displace the rear surface lens segment on the carrier lens rear surface.

Spectacles according to the disclosure comprise one or two spectacle lenses of the type described above. Furthermore, the spectacles according to the disclosure comprise an eye position detection device (so-called Eye Tracker) for detecting the position of an eye of a spectacles wearer wearing the spectacles, and a drive control device for controlling the front surface lens segment drive and/or the rear surface lens segment drive depending on the position of the eye detected by the eye position detection device. In this case, the corresponding lens segment can be tracked such that it follows the gaze movements of the eye and the visual point of the eye through the spectacle lens always remains the same. In this regard, it is possible for example even with a single degree of freedom of the displacement movement, in the case of progressive lenses, to concomitantly guide the progression channel in the case of a lateral gaze.

The object stated in the introduction is achieved in its entirety by the exemplary embodiments according to the disclosure.

The uniform predeterminacy of the optical properties and the reliability of the mechanical properties of the spectacle lens according to the disclosure can be ensured if the front surface lens segment has a front surface lens segment rear surface, which bears shape-complementarily on the carrier lens front surface during displacement, and/or if the rear surface lens segment has a rear surface lens segment front surface, which bears shape-complementarily on the carrier lens rear surface during displacement. A misalignment of the relative arrangement of carrier lens and lens segment(s) is scarcely possible or at least made more difficult.

Displacement movements of the respective lens segment along an axis can be ensured for example by mechanical scissor levers or telescopic extensions acting as (front and/or rear surface) lens segment drives. The term scissor levers denotes paired rods which, placed crosswise one on top of the other, are connected to a spindle at this crossover point. A movement of two lever ends that is directed toward one another results in a movement of identical type at the respective opposite lever ends. This lever movement can be utilized to generate a movement perpendicular to the initiating movement. In the present case, the lens segment is arranged at one lever end, while a force generator is situated at the other lever end. A telescopic extension is a rail guide comprising at least two guide rails whose profiles run into one another. The guide rails can be embodied as a rolling or sliding guide. In the present case, the lens segment is arranged at one end, which lens segment can be controlled via a force generator.

Alternatively, drives by means of electroactive polymers, (linear) motors, microfluidic systems and suchlike are possible for generating the displacement movements. A linear motor does not cause the lens segment driven by it to effect a rotary movement, for example, but rather shifts the lens segment on a rectilinear or curved path (translational movement) over the (bearing) surface of the carrier lens. Electroactive polymers are polymers which change their shape as a result of the application of an electrical voltage. These materials find application very generally as actuators, which predestines the latter for the present case of application. On account of the similarity of their functioning to that of natural muscles, they are often also called "artificial muscles." Advantages of electroactive polymers in comparison with other actuator materials, such as piezoelectric ceramics, for example, which in the context of the present disclosure can of course likewise be used as drives for the lens segment or the lens segments, are the high expansions that can be achieved (up to 380%). The term "active microfluidics" is employed if the manipulation of the working fluids is controlled in a targeted manner by active (micro-) components such as micropumps or microvalves. Micropumps convey or meter liquids; microvalves determine the direction and/or the movement mode of pumped media.

For the case of displaceability in only one axial direction, e.g., two opposite sides of the movable lens segment can be embodied in a toothed fashion (that is to say as a toothed rod). The movable lens segment can then be driven and displaced by gearwheels (which can easily be hidden in the frame of the spectacles). In an embodiment with horizontal displacement movement, the lens segment can extend e.g., over the entire height of the carrier lens. In an embodiment with vertical displacement movement, the lens segment can extend in a corresponding manner, e.g., over the entire width of the carrier lens.

While the carrier lens surface on which no lens segment is arranged can be fashioned in an arbitrary manner, the shape of the carrier lens surface on which the lens segment is guided displaceably is to be adapted to the shape of the lens segment surface arranged thereon to satisfy both optical and mechanical requirements on account of the displacement. Particularly if the shape complementarity of the surfaces adjoining one another is intended to be maintained during the displacement, the shape of the surfaces adjoining one another is no longer arbitrary.

A shape complementarity can be achieved, e.g., for toric surfaces of carrier lens and lens segment that adjoin one another if only linear movements in an equatorial direction of the toric surface of the carrier lens are permitted. A direction independence during the displacement is possible if the carrier lens front surface, on which the front surface lens segment is guided displaceably, is embodied in a spherical fashion, and/or if the carrier lens rear surface, on which the rear surface lens segment is guided displaceably, is embodied in a spherical fashion. In a corresponding manner, it is typical if the front surface lens segment rear surface situated in contact with the carrier lens front surface is embodied in a shape-complementarily spherical fashion, and/or if the rear surface lens segment front surface situated in contact with the carrier lens rear surface is embodied in a shape-complementarily spherical fashion.

Higher-order imaging aberrations of the eye can be corrected only for a specific viewing direction in the case of a spectacle lens. In the case of spectacles comprising spectacle lenses of the type described above, it is possible to correct the higher-order imaging aberrations of the eye for different viewing directions by the lens segment that is tracked to the viewing eye not being tilted relative to the viewing direction during the tracking. This means that the tracking must be carried out on a spherical surface whose origin lies at the fulcrum of the eye. Since the spectacle lens is generally arranged at a distance of 25 mm to 30 mm from the fulcrum of the eye, it is expedient if the spherical carrier lens front surface, on which the front surface lens segment is concomitantly guided displaceably, has a radius r that is in a range of between 26 mm and 36 mm. In the case of a rear surface lens segment that is concomitantly guided displaceably, the spherical carrier lens rear surface has a radius r that is in a range of between 25 mm and 35 mm.

To achieve a high mobility between carrier lens and lens segment, in one particularly typical examplary embodiment, the disclosure provides for the carrier lens front surface, on which the front surface lens segment is guided displaceably, to carry an adhesion-reducing coating, and/or for the carrier lens rear surface, on which the rear surface lens segment is guided displaceably, to carry an adhesion-reducing coating, and/or for the front surface lens segment, which is guided displaceably on the carrier lens front surface, to carry an adhesion-reducing coating, and/or for the rear surface lens segment, which is guided displaceably on the carrier lens rear surface, to carry an adhesion-reducing coating. Besides the effect of improving the sliding property of the respective lens segment on the carrier lens, abrasion can be prevented to the greatest possible extent.

In a further exemplary embodiment, the front surface lens segment can have a display device (e.g., a display with input coupling optical assembly) for displaying information. Alternatively or additionally, the rear surface lens segment can have a display device for displaying information. On account of the displaceability of the corresponding lens segment, the information—depending on the exemplary embodiment—can be provided at the location at which it is needed, without a need to change the viewing direction of the wearer of the spectacles. Furthermore, the technology can also be utilized to combat weaknesses of current power-correcting smartglasses. By applying the dioptric (single-vision or progressive) power on the surface of the carrier lens on which no lens segment is guided displaceably, with a corresponding spherical support surface for the lens segment, it is possible for the lens segment acting as an element of smartglasses to be positioned dynamically or statically according to individual requirements.

In one exemplary embodiment of the disclosure, provision is made for the front surface lens segment to have a front surface lens segment front surface having a location-dependent surface refractive power, and/or for the rear surface lens segment to have a rear surface lens segment rear surface having a location-dependent surface refractive power. The refractive power of the spectacle lens can thus be set to the object distance for the respective viewing direction.

In a further exemplary embodiment, in addition to the eye position detection device and the drive control device, the spectacles according to the disclosure can be equipped with a distance detection device for detecting the distance of an object viewed by the eye. In this case, the drive control device is configured to control the front surface lens segment drive and/or the rear surface lens segment drive depending on the position of the eye detected by the eye position detection device and depending on the distance of the viewed object detected by the distance detection device.

From the combined information from eye position detection device (Eye Tracker) and distance detection device, a correction that is ideal for the current distance can be presented to the wearer of the spectacles. In this regard, proceeding from current progressive lens designs, depending on the viewing distance determined, the near part, distance part, or the appropriate section of the progression channel can be presented in front of the pupil if the displaced lens segment has a power distribution corresponding to the corresponding zones of a conventional progressive lens.

As an alternative (or in addition) to an embodiment of the concomitantly guided lens segment having a location-dependent surface refractive power, the disclosure provides for the front surface lens segment to have an (in particular e.g., also spatially) ??? variable refractive power, and/or for the rear surface lens segment to have an (in particular e.g., also spatially) variable refractive power. By this means, too, it is possible to adapt the refractive power of the respective spectacle lens to the respective object distance and/or the required power for correcting higher-order aberrations of the eye.

By way of example, the front surface lens segment can have a front surface lens segment front surface having an (in particular e.g., also spatially) variable surface refractive power, and/or the rear surface lens segment can have a rear surface lens segment rear surface having an (in particular e.g., also spatially) variable surface refractive power. One example of a lens having a variable refractive power, in the case of which the surface refractive power is variable, and which can be used as a lens segment in accordance with the present invention, is known from DE 100 47 323 B4.

Spectacles comprising an automatic mechanism for setting the refractive power comprise a variation device configured to vary:
(a) the variable refractive power of the front surface lens segment and/or of the rear surface lens segment; and/or
(b) the variable surface refractive power of the front surface lens segment front surface of the front surface lens segment and/or the variable surface refractive power of the rear surface lens segment rear surface of the rear surface lens segment;
depending on the position of the eye detected by the eye position detection device.

In addition, the spectacles can be equipped with a distance detection device for detecting the distance of an object viewed by the eye of the spectacles wearer wearing the spectacles. According to this exemplary embodiment of the disclosure, the variation device is then designed to vary
(a) the variable refractive power of the front surface lens segment and/or of the rear surface lens segment; and/or
(b) the variable surface refractive power of the front surface lens segment front surface of the front surface lens segment and/or the variable surface refractive power of the rear surface lens segment rear surface of the rear surface lens segment;
depending on the position of the eye detected by the eye position detection device and depending on the distance of the viewed object detected by the distance detection device.

This technology described above makes it possible to individually define the position of the near part in the case of a bifocal lens or the position of the intermediate and near parts in the case of a progressive lens, wherein the same carrier lens (e.g., a spherical single-vision lens) could always be used. Special applications, such as pilot spectacles comprising degressive spectacle lenses, are also readily possible as a result.

As a result of the automatic "concomitant guidance" of the movable lens segment or of the movable lens segments, in addition to the aberrations that can conventionally be corrected, such as sphere; cylinder and associated axis; and prism and associated base, higher-order aberrations can also be corrected.

BRIEF DESCRIPTION OF THE DRAWINGS

The disclosure will now be described with reference to the drawings wherein.

DESCRIPTION OF EXEMPLARY EMBODIMENTS

Identical or functionally identical components are provided with the same reference signs.

Figure 1:
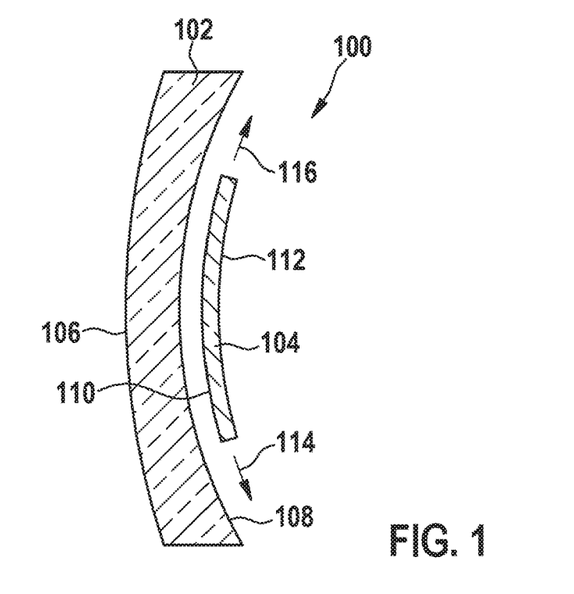
FIG. 1 shows a basic diagram of an exemplary embodiment of a spectacle lens according to the disclosure in central cross section.

FIG. 1 shows a spectacle lens 100 according to the disclosure as a basic illustration in central cross section. The spectacle lens 100 comprises a carrier lens 102 and a lens segment 104. The carrier lens 102 is a spherical single-vision lens having a spherical front surface 106 and a spherical rear surface 108. In the present exemplary embodiment, the lens segment 104 is also a spherical lens having a spherical front surface 110 and a spherical rear surface 112 having a radius r of 28 mm.

The rear surface 108 of the carrier lens 102 is embodied shape-complementarily to the front surface 110 of the lens segment 104. The front surface 110 of the lens segment 104 is arranged on the rear surface 108 of the carrier lens 102 and in a manner sliding thereon. To reduce adhesion, the surfaces 108, 110 that slide on one another are provided with an adhesion-reducing coating. By way of example, the product sold under the trade name SURFCLEAR® by Canon Optron Inc. has proved to be suitable. Using the terms above, the embodiment variant shown in the FIG. ??? involves a spectacle lens 100 comprising a carrier lens 102 and a rear surface lens segment 104 arranged on the carrier lens rear surface 108, wherein the rear surface lens segment 104 is guided displaceably—as is indicated with the aid of the arrows 114, 116 in FIG. 1—on the carrier lens rear surface 108.

Mechanical concomitant guidance of the rear surface lens segment 104 is striven for according to the disclosure. For this purpose, the rear surface lens segment 104 is mounted movably in one or two axes (not shown in FIG. 1). In the present exemplary embodiment, this rear surface lens segment 104 to be established individually bears, besides the spherical fine correction that is possibly still required, all further prescription (Rx) parameters (namely cylinder, axis, etc.). The rear surface 112 of the rear surface lens segment 104 can be present in spherical, astigmatic, or progressive form. The rear surface lens segment 104 can be configured for correcting the higher-order aberrations taking account of the dioptric power of the carrier lens 102.

The position of the movable rear surface lens segment 104 is calculated, e.g., on the basis of the stipulations of an optician, ophthalmologist, or Eye Care Professional (ECP) on account of the individual requirement of the wearer of the spectacles and, during the production step, is fixedly anchored (adhesively bonded, laminated, etc.) by the manufacturer in a manner guided displaceably on the carrier lens 102. Thus, a near part with additional power (e.g., addition) can be fitted at an arbitrary location (horizontally for inset and vertically in accordance with the required gaze lowering or as in pilot spectacles, that is to say, at the top in the lens) in the carrier lens 102. Inset of a progressive spectacle lens is understood to mean the horizontal distance between the accommodation point and the center of the predetermined near part.

Instead of the calculation and anchoring by the manufacturer, the position of the movable lens segment 104 can also be calculated by the manufacturer on the basis of the stipulations by the optician, ophthalmologist, or ECP on account of the individual customer requirement and can be anchored on the carrier lens 102 of the spectacle lens 100 by the optician, ophthalmologist, or ECP himself/herself during the dispensing of spectacles.

Figure 2:
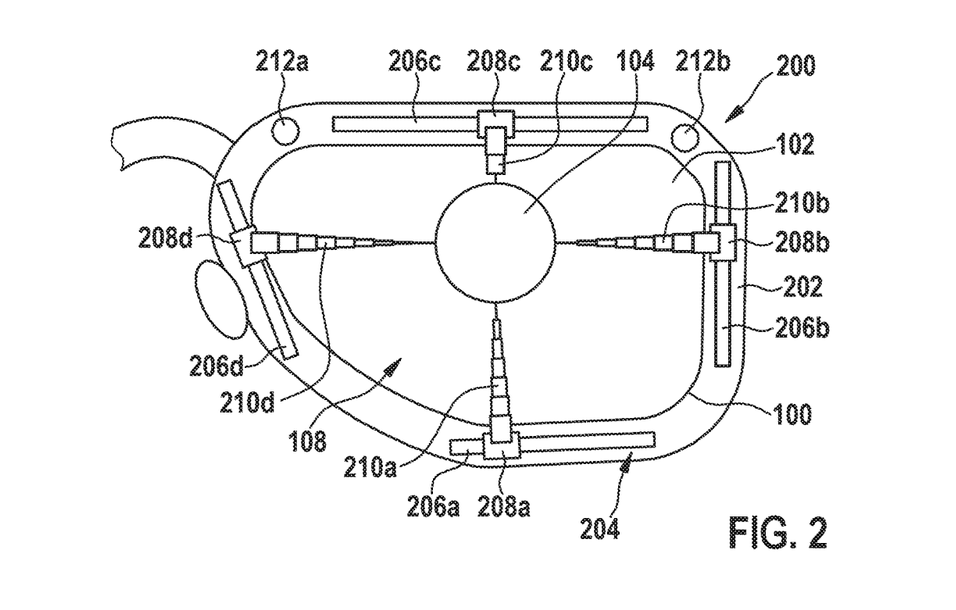
FIG. 2 shows the right-hand part of the exemplary embodiment of spectacles according to FIG. 1 in a plan view from the eye side.
Figure 3:
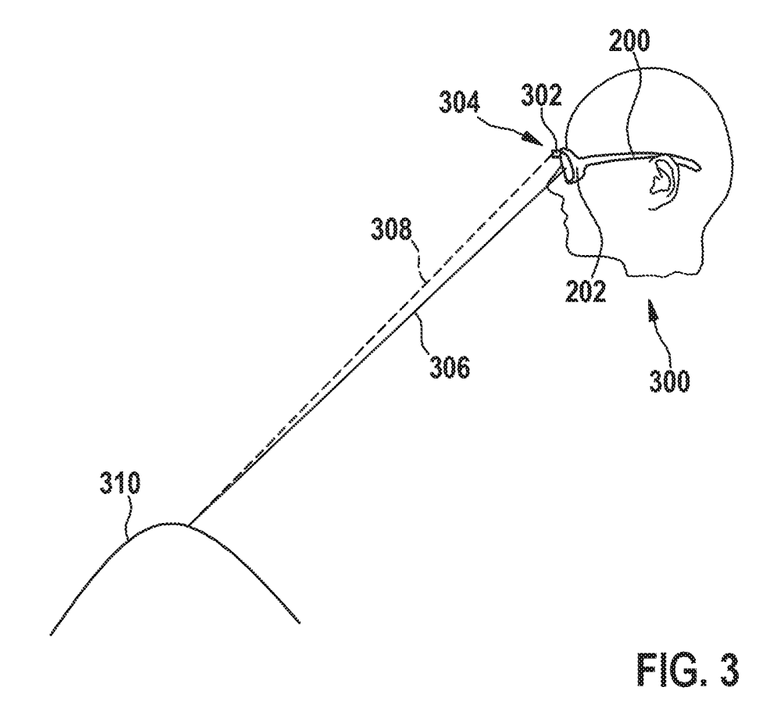
FIG. 3 shows a person wearing the spectacles according to the disclosure in accordance with the figure.

FIGS. 2 and 3 show an exemplary embodiment of spectacles 200 according to the disclosure. The spectacles 200 comprise a spectacle frame 202, into which a spectacle lens 100 of the type described above is inserted. FIG. 2 reveals the carrier lens 102 and the rear surface lens segment 104. The spectacles 200 have a rear surface lens segment drive in order to displace the rear surface lens segment 104 on the carrier lens rear surface 108. The rear surface lens segment drive comprises a rod mechanism secured on the rear side 204 of the spectacle frame 202 and consisting of four sliding rods 206a, 206b, 206c, 206d, four linear motors 208a, 208b, 208c, 208d, each of which is respectively guided displaceably on one of the four sliding rods 206a, 206b, 206c, 206d, and also four telescopic drives 210a, 210b, 210c, 210d, which are respectively connected to the rear surface lens segment 104 at one end side and are respectively connected to one of the linear motors 208a, 208b, 208c, 208d at the other end side. With the aid of the linear motors 208a, 208b, 208c, 208d and the telescopic drives 210a, 210b, 210c, 210d, the rear surface lens segment 104 can be displaced and positioned over the rear surface 108 of the carrier lens 102 in a virtually arbitrary manner.

An Eye Tracker is integrated in the spectacle frame 202. FIG. 2 shows two cameras 212a, 212b of the Eye Tracker, which record images of the eye of the wearer of the spectacles, from which images the instantaneous position of the pupil center of the eye and the instantaneous viewing direction 306 of the wearer 300 of the spectacles are determined.

Furthermore, a drive control device (cannot be shown since it is hidden in the spectacle frame) is situated in the spectacle frame 202, the drive control device controlling the rear surface lens segment drive 208a, 208b, 208c, 208d, 210a, 210b, 210c, 210d such that the movable lens segment 112 is tracked to the viewing movements of the eye such that the visual point of the eye of the wearer 300 of the spectacles through the spectacle lens 100 always remains the same.

In this regard, even with just one degree of freedom, it would be possible, for example, in the case of progressive lenses, to concomitantly guide the progression channel in the case of a lateral gaze.

In the present stage of development, the spectacles according to the disclosure are additionally equipped with a distance detection device 302, which is situated on the front side 304 of the spectacle frame 202. The distance detection device 304 can detect the distance 308 of an object 310 viewed by the eye of the wearer 300 of the spectacles. From the combined information from Eye Tracker 212a, 212b and distance detection device 304, a correction that is ideal for the current distance can be presented to the wearer 300 of the spectacles by means of suitable control and displacement of the lens segment 104. In this regard, e.g., proceeding from current progressive lens designs, depending on the viewing distance determined, the near part, the distance part or the appropriate section of the progression channel can be presented in front of the pupil of the wearer 300 of the spectacles.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. Spectacles comprising:
  (i) a spectacle lens including:
    a carrier lens having a carrier lens front surface and a carrier lens rear surface; and
    at least one of a front surface lens segment arranged on the carrier lens front surface or a rear surface lens segment arranged on the carrier lens rear surface;
    at least one of the front surface lens segment being guided displaceably on the carrier lens front surface or the rear surface lens segment being guided displaceably on the carrier lens rear surface;
  (ii) at least one of a front surface lens segment drive configured to displace the front surface lens segment on the carrier lens front surfaceor a rear surface lens segment drive configured to displace the rear surface lens segment on the carrier lens rear surface;

(iii) an eye position detection device configured to detect the position of an eye of a spectacles wearer wearing the spectacles; and (iv) a drive control device for controlling at least one of the front surface lens segment drive or the rear surface lens segment drive on the position of the eye detected by the eye position detection device;

wherein the drive control device is configured to control the at least one of the front surface lens segment drive or the rear surface lens segment drive to displace the at least one of the front surface lens segment or the rear surface lens segment based on tracked viewing movements of the eye.

2. The spectacles as claimed in claim 1, wherein the drive control device is configured to control the at least one of the front surface lens segment drive or the rear surface lens segment drive to displace the at least one of the front surface lens segment or the rear surface lens segment based on tracked viewing movements of the eye so that a visual point of the eye of the wearer of the spectacles through the spectacle lens always remains the same.

3. The spectacles as claimed in claim 1, wherein the at least one of the front surface lens segment or the rear surface lens segment has a power distribution corresponding to a near part, a distance part, and a progression channel of a conventional progressive lens.

4. The spectacles as claimed in claim 3, wherein the drive control device is configured to control the at least one of the front surface lens segment drive or the rear surface lens segment drive to displace the front surface lens segment or the rear surface lens segment, respectively, so that, in accordance with the detected distance, the near part, the distance part, or the appropriate section of the progression channel is presented in front of a pupil of the eye.

5. The spectacles as claimed in claim 1, wherein the drive control device is configured to control the at least one of the front surface lens segment drive or the rear surface lens segment drive so that the at least one of the front surface lens segment or the rear surface lens segment, respectively, is not tilted relative to a viewing direction of the eye while being displaced.

6. The spectacles as claimed in claim 1, wherein at least one of the carrier lens front surface, on which the front surface lens segment is guided displaceably, is a spherical cap, or the carrier lens rear surface, on which the rear surface lens segment is guided displaceably, is a spherical cap, and wherein at least one of the spherical carrier lens front surface has a radius (r) that is in a range of between 26 mm and 36 mm, or the spherical carrier lens rear surface has the radius (r) that is in a range of between 25 mm and 35 mm.

7. The spectacles as claimed in claim 1, wherein at least one of the carrier lens front surface, on which the front surface lens segment is guided displaceably, is a spherical cap, or the carrier lens rear surface, on which the rear surface lens segment is guided displaceably, is a spherical cap, and wherein at least one of the spherical carrier lens front surface has a radius (r) that is in a range of between 26 mm and 36 mm, or the spherical carrier lens rear surface has the radius (r) that is in a range of between 25 mm and 35 mm, and wherein the drive control device is configured to control the at least one of the front surface lens segment drive or the rear surface lens segment drive so that the at least one of the front surface lens segment or the rear surface lens segment, respectively, is not tilted relative to a viewing direction of the eye while being displaced.

8. The spectacles as claimed in claim 1, wherein at least one of the front surface lens segment has a front surface lens segment rear surface, which bears shape-complementarily on the carrier lens front surface during displacement or the rear surface lens segment has a rear surface lens segment front surface, which bears shape-complementarily on the carrier lens rear surface during displacement.

9. The spectacles as claimed in claim 1, wherein an adhesion-reducing coating is arranged on at least one of the carrier lens front surface, the carrier lens rear surface, the front surface lens segment, or the rear surface lens segment.

10. The spectacles as claimed in claim 1, further comprising:

a display device for displaying information arranged on at least one of the front surface lens segment or the rear surface lens segment.

11. The spectacles as claimed in claim 1, further comprising:

a distance detection device configured to detect a distance of an object viewed by the eye of the spectacles wearer wearing the spectacles, wherein the drive control device is configured to control the at least one of the front surface lens segment drive or the rear surface lens segment drive depending on the position of the eye detected by the eye position detection device and depending on the distance of the viewed object detected by the distance detection device.

12. The spectacles as claimed in claim 1, wherein the front surface lens segment has a variable refractive power.

13. The spectacles as claimed in claim 12, further comprising:

a variation device configured to vary, depending on the position of the eye detected by the eye position detection device, at least one of:

(a) a variable refractive power of the front surface lens segment; or (b) the variable surface refractive power of the front surface lens segment front surface of the front surface lens segment.

14. The spectacles as claimed in claim 13, further comprising:

a distance detection device configured to detect a distance of an object viewed by the eye of the spectacles wearer wearing the spectacles, wherein the variation device is configured to vary, depending on the position of the eye detected by the eye position detection device and depending on the distance of the viewed object detected by the distance detection device, at least one of:

(a) the variable refractive power of the front surface lens segment; or (b) the variable surface refractive power of the front surface lens segment front surface of the front surface lens segment.

15. The spectacles as claimed in claim 1, wherein at least one of the front surface lens segment has a front surface lens segment front surface having a variable surface refractive power or the rear surface lens segment has a rear surface lens segment rear surface having a variable surface refractive power.

16. The spectacles as claimed in claim 1, wherein the rear surface lens segment has a variable refractive power.

17. The spectacles as claimed in claim 16, further comprising:

a variation device configured to vary, depending on the position of the eye detected by the eye position detection device, at least one of:
(a) a variable refractive power of the rear surface lens segment; or
(b) the variable surface refractive power of the rear surface lens segment rear surface of the rear surface lens segment.

18. The spectacles as claimed in claim 17, further comprising:
a distance detection device configured to detect a distance of an object viewed by the eye of the spectacles wearer wearing the spectacles, wherein
the variation device is configured to vary, depending on the position of the eye detected by the eye position detection device and depending on the distance of the viewed object detected by the distance detection device, at least one of:
(a) the variable refractive power of a the rear surface lens segment; or
(b) the variable surface refractive power of the rear surface lens segment rear surface of the rear surface lens segment.

19. A method for controlling spectacles having a spectacle lens, the method comprising:
providing a spectacle lens including:
a carrier lens having a carrier lens front surface and a carrier lens rear surface, and
at least one of a front surface lens segment arranged on the carrier lens front surface or a rear surface lens segment arranged on the carrier lens rear surface,
displaceably guiding at least one of the front surface lens segment on the carrier lens front surface or the rear surface lens segment on the carrier lens rear surface;
providing spectacles including (1) at least one of a front surface lens segment drive or a rear surface lens segment drive; (2) an eye position detection device for detecting the position of an eye of a spectacles wearer wearing the spectacles; and (3) a drive control device for controlling, depending on the position of the eye detected by the eye position detection device, at least one of the front surface lens segment drive or the rear surface lens segment drive;
tracking viewing movements of the eye with the eye position detection device;
displacing at least one of the front surface lens segment on the carrier lens front surface with the front surface lens segment drive or the rear surface lens segment on the carrier lens rear surface with the rear surface lens segment drive; and
controlling at least one of the front surface lens segment drive or the rear surface lens segment drive with the drive control device so that the at least one of the front surface lens segment or the rear surface lens segment is not tilted relative to a viewing direction of the eye during the tracking with the eye position detection device.

20. A method of operating spectacles having a spectacle lens, the method comprising:
providing a spectacle lens including:
a carrier lens having a carrier lens front surface and a carrier lens rear surface, and
at least one of a front surface lens segment arranged on the carrier lens front surface or a rear surface lens segment arranged on the carrier lens rear surface,
displaceably guiding at least one of the front surface lens segment on the carrier lens front surface or the rear surface lens segment on the carrier lens rear surface;
providing spectacles including (1) at least one of a front surface lens segment drive or a rear surface lens segment drive; (2) an eye position detection device for detecting the position of an eye of a spectacles wearer wearing the spectacles; and (3) a drive control device for controlling, depending on the position of the eye detected by the eye position detection device, at least one of the front surface lens segment drive or the rear surface lens segment drive;
tracking viewing movements of the eye with the eye position detection device;
displacing at least one of the front surface lens segment on the carrier lens front surface with the front surface lens segment drive or the rear surface lens segment on the carrier lens rear surface with the rear surface lens segment drive on a spherical surface whose origin lies at a fulcrum of the eye.

* * * * *

UNITED STATES PATENT AND TRADEMARK OFFICE
CERTIFICATE OF CORRECTION

PATENT NO. : 10,185,161 B2
APPLICATION NO. : 15/947841
DATED : January 22, 2019
INVENTOR(S) : Jeremias Gromotka, Timo Kratzer and Gerhard Kelch It is certified that error appears in the above-identified patent and that said Letters Patent is hereby corrected as shown below:

In the Specification

Column 5, Line 36: delete "??? variable" and insert -- variable -- therefor.

Column 6, Line 64: delete "the FIG. ???" and insert -- FIG. 1 -- therefor.

In the Claims

Column 8, Line 67 in Claim 1: delete "surfaceor" and insert -- surface or -- therefor.

Column 12, Line 36 in Claim 20: delete "device;" and insert -- device; and -- therefor.

Signed and Sealed this
Twenty-fifth Day of June, 2019

Andrei Iancu
*Director of the United States Patent and Trademark Office*